United States Patent [19]

Siddiqui et al.

[11] Patent Number: 5,395,431
[45] Date of Patent: Mar. 7, 1995

[54] AQUEOUS BASED JET INK

[75] Inventors: Mohammed W. Siddiqui, Carol Stream; Snehal S. Desai, Lombard, both of Ill.

[73] Assignee: Videojet Systems International, Inc., Wood Dale, Ill.

[21] Appl. No.: 79,980

[22] Filed: Jun. 22, 1993

[51] Int. Cl.$^6$ ............................................. C09D 11/02
[52] U.S. Cl. ................................ 106/20 R; 106/22 R; 106/30 R
[58] Field of Search ................ 106/20 R, 22 R, 30 R

[56] References Cited

U.S. PATENT DOCUMENTS

| | | | |
|---|---|---|---|
| 4,530,961 | 7/1985 | Nguyen et al. | 106/20 R |
| 4,959,661 | 9/1990 | Buxton et al. | 106/23 R |
| 5,098,478 | 3/1992 | Krishnan et al. | 106/20 R |
| 5,169,436 | 12/1992 | Matrick | 106/22 R |
| 5,169,438 | 12/1992 | Matrick | 106/22 R |
| 5,224,987 | 7/1993 | Matrick | 106/20 R |
| 5,250,109 | 10/1993 | Chan et al. | 106/20 R |
| 5,254,158 | 10/1993 | Breton et al. | 106/20 R |
| 5,268,027 | 12/1993 | Chan et al. | 106/20 R |
| 5,273,573 | 12/1993 | Kappele | 106/22 R |

FOREIGN PATENT DOCUMENTS

| | | |
|---|---|---|
| 4189876 | 7/1990 | Japan . |
| 3-134073 | 6/1991 | Japan . |
| 4-018461 | 1/1992 | Japan . |
| 4-018467 | 1/1992 | Japan . |
| 4-149286 | 5/1992 | Japan . |

*Primary Examiner*—Helene Klemanski
*Attorney, Agent, or Firm*—Leydig, Voit & Mayer, Ltd.

[57] ABSTRACT

An ink composition suitable for ink jet printing operations, comprising a colorant, water, and surfactant, said composition having a surface tension of less than about 30 dynes/cm.

10 Claims, No Drawings

AQUEOUS BASED JET INK

FIELD OF THE INVENTION

The present invention relates to ink jet printing compositions and, more particularly, to ink jet printing compositions that can be used to print form printed images, such as cancellation marks, on postage stamps.

BACKGROUND OF THE INVENTION

Ink jet printing is a well-known technique by which printing is accomplished without contact between the printing device and the substrate on which the printed characters are deposited. Briefly described, ink jet printing involves the technique of projecting a stream of ink droplets to a surface and controlling the direction of the stream electronically so that the droplets are caused to form the desired printed image on that surface. This technique of noncontact printing is particularly well suited for application of characters onto irregularly shaped surfaces, including, for example, the bottom of beverage containers.

In general, an ink jet composition must meet certain rigid requirements to be useful in ink jet printing operations. These relate to viscosity, resistivity, solubility, compatibility of components and wettability of the substrate. Further, the ink must be quick-drying and smear resistant, must be capable of passing through the ink jet nozzle without clogging, and must permit rapid cleanup of the machine components with minimum effort.

However, despite the many advantages of ink jet printing, it has not, to date, been used to print images on postage stamps. To date, an ink composition which both meets the requirements for use in ink jet printing and the requirements for printing on postage stamps has not been found.

The printing of images on postage stamps, such as cancellation marks, is currently accomplished by contact printing, which involves the use of printing rollers. The cancellation marks printed in this manner dry slowly, and often do not pass the stringent tests for indelibility conducted by postal authorities throughout the world. Because print rollers are used, information appearing on the cancellation mark, such as the date, must be changed manually every day. This is obviously time-consuming. Further, contact printing allows only a limited amount of information to be printed.

Although ink jet printing would appear to present a useful means for printing stamp cancellation marks, ink jet formulations to date, have not been uniformly suitable for printing on all stamp varieties. Obviously, it is an absolute requirement for any cancellation method that the cancellation mark be uniformly and consistently printed on all stamps. Accordingly, ink jet printing, to date, has not been suitable for printing cancellation marks.

Further, the ink must meet the indelibility tests conducted by the various post authorities for stamp cancellation ink. To meet these tests, the ink must be at least resistant to water, and aqueous solutions of acetone, methanol, ethanol, glycol ethers, and detergents. Finally, in addition to meeting the special requirements for stamp cancellation, the ink must meet the general requirements listed above relating to viscosity, resistivity, etc., before it can be used in an ink jet printing operation.

Heretofore, an ink jet composition meeting all of the above-noted needs has not been available. Such needs are now satisfied by the present invention, the description of which follows.

SUMMARY OF THE INVENTION

For an ink jet composition to be useful for stamp cancellation requirements, it must meet certain requirements. The inventors have discovered that an ink jet composition, to be useful in postage stamp cancellation operations, must have a surface tension lower than the surface energy of the postage stamp. Otherwise, the ink composition will not wet the stamp adequately and subsequently penetrate the surface of the stamp. Since many postage stamps have a surface energy of approximately 30 dynes/cm, the ink must have a surface tension of less than 30 dynes/cm to be useful generally in stamp cancellation operations.

The present invention, therefore utilizes this discovery and provides ink jet compositions for forming printed images, such as cancellation harks, on postage stamps. These compositions utilize an aqueous solution of a colorant and surfactant, and have a surface tension of less than about 30 dynes/cm. Further, the present invention provides ink jet compositions which meet the stringent indelibility tests of postal authorities worldwide, i.e., the ink compositions are resistant to water, and aqueous solutions of methanol., ethanol, glycol ethers, and detergents.

The present invention allows stamp cancellation to be accomplished via ink jet printing, instead of by contact printing. As a result, stamp cancellation can be accomplished more quickly, without the need for information appearing on the cancellation mark to be manually entered or changed. The ink compositions of the present invention also dry quickly, are resistant to various solvents and other chemicals, and have excellent light fastness.

DETAILED DESCRIPTION OF THE PREFERRED EMBODIMENTS

As described hereinabove, the ink compositions of the present invention comprise water, a colorant, and a surfactant. Other optional components may be present in carefully balanced proportions to achieve preferred operation of the ink in an ink jet printing apparatus.

In one embodiment, the present invention provides an ink composition suitable for ink jet printing of printed images, such as cancellation marks, on postage stamps comprising water, a colorant, and surfactant, said ink composition having a surface tension of less than 30 dynes/cm, and being capable of passing the specific indelibility tests of postal authorities world-wide.

In addition, there is provided a method of printing images, such as cancellation marks, on postage stamps comprising printing onto said stamps, by ink jet printing, a jet ink composition comprising water, a colorant, and surfactant, said composition having a surface tension of less than 30 dynes/cm, and being capable of passing the specific indelibility tests of postal authorities worldwide.

In general, the ink compositions of the present invention exhibit the following characteristics for use in ink jet printing systems: (1) a viscosity from about 1.6 to about 7.0 centipoises at 25° C., (2) an electrical resistivity from about 50 to about 2000 ohm-cm, and (3) a sonic velocity from about 1200 to about 1700 meters/second.

The inks dry within 1 to 30 seconds, with rapid ink penetration on stamps printed by either lithographic, intaglio or gravure processes. This rapid ink penetration is due to the low surface tension of the ink compositions of the present invention, which is less than 30 dynes/cm. This low surface tension is critical to the operability of the ink compositions in stamp cancellation operations and results in more rapid dry times than inks with surface tensions over 30 dynes/cm. Those inks penetrate slowly, resulting in dry times greater than 30 seconds. U.S. Pat. No. 4,959,661 discloses an aqueous dispersion comprising carbon black, deionized water, and surfactant, with said dispersion having a surface tension of greater than 35 dynes/cm. This ink composition could not be used in stamp cancellation operations because it would not rapidly penetrate numerous postage stamps.

THE COLORANT

Suitable colorants for use in the ink compositions of the present invention must meet the various indelibility tests of postal authorities throughout the world and can be chosen based on the needs of specific postal authorities. In general, the colorant should be resistant to water, and aqueous solutions of acetone, methanol, ethanol, glycol ethers, and detergents. Both pigments and dyes can be used, although pigments are preferred.

The pigment particles are preferably pre-dispersed. They should be uniform in size, with a particle size of from about 0.01 to about 1.0 microns and should be stable in dispersion. Dispersion properties should remain constant at temperatures up to about 110° F., and the dispersion should not show any signs of sedimentation for at least 18 months. In other words, the sedimentation rate should remain less than 10 mg/hr. over that time period. There should additionally be no agglomeration of pigment particles in the dispersion.

The preferred pigment for use in the present invention is carbon black, which is commercially available in a pigment dispersion as Hostafine Black TS from Hoechst Celanese. Other pigments useful in the present invention include red organic pigments.

As stated earlier, dyes can also be used; however, they may not be resistant to all test solutions. Suitable dyes include Pontamine Blue SP (liquid) (Direct Blue 279), Bayscript Black CA (acid dye), Special Black SP (liquid) (Direct Black), Special Black HF (liquid) (Direct Black) Ponolith Fast Black P (liquid) (Pigment Black), Levafix Black PN-GR (liquid 33%) (Reactive Black), and Levaderm Black N (liquid) (Acid Black 139), all available from Miles, Inc.; Elcacid Nigrosine, Pdr. (Acid Black 2) available from International Dyestuffs; Duasyn Direct Black HEF-SF VP332 (Direct Black 168), Duasyn Direct Turquoise Blue FPL-SF368 (Direct Blue 99), and Duasyn Black RL-SF VP228 (Reactive Black 31), all available from Hoechst Cellanese; and Projet Black PZ (liquid) (Direct Black 168) available from ICI Colors.

In general, the colorant should be present in the ink composition in an amount from about 7% to about 15% by weight of the composition, with an amount of from about 8% to about 13% by weight or the composition being preferred.

THE CARRIER

Water is used as the carrier for the colorant and the surfactant in the ink compositions of the present invention. Deionized water is preferred, for reasons of purity and to minimize interference of foreign ions during the printing process. Typically, water is present in an amount from about 70% to about 90% by weight of the ink composition, and is preferably present in an amount from about 74% to about 84%.

THE SURFACTANT

The purpose of the surfactant in the ink compositions of the present invention is to reduce the surface tension of the compositions below 30 dynes/cm. The surfactant should be soluble, stable, and preferably non-foaming in the pigment dispersion. In general, suitable surfactants include acetylenic liquid non-ionic surfactants, and non-ionic and anionic surfactants.

More than one surfactant may be used, with the total amount present being an amount sufficient to lower the surface tension of the ink composition below 30 dynes/cm. Typically, from about 0.2% to about 1.0%, of surfactant by weight of the composition should be used, with an amount from about 0.5% to about 0.8% by weight of the composition being preferred. Preferred surfactants are available as Surfynol TGE and Surfynol 104 PG50, both from Air Products.

OPTIONAL COMPONENTS

Other components may also be included in the ink compositions of the present invention to impart characteristics desirable for ink jet printing applications. These components include humectants, which prevent the ink jet tip from drying, and may also increase ink penetration into the surface of the stamp. Suitable humectants include glycols, ethylene glycol ethers, diethylene glycol ethers, and propylene glycol ethers being preferred for environmental and safety reasons. The humectant, if used, should be present in an amount of from about 2.5% to about 7.0% by weight of the composition, with from about 3.0 to about 5.0% by weight of the composition being preferred.

Resins may also be added to boost the viscosity of the ink compositions. Useful resins include polyester emulsions, acrylic emulsions, acrylic resins, polyvinyl alcohol, cellulose acetate resin, polyvinyl pyrrolidone, styrenated shellac emulsions, and acrylated shellac emulsions. Preferred resins are available as Airvol 205 S from Air Products or the Joncryls from Johnson Wax. The resin, if used, should be present in an amount from about 0.2% to about 5% by weight of the ink composition. The preferred amount of resin, if resin is used, if from about 0.5% to 4.5% by weight of the composition.

Basic materials may also be added to increase the pH of the ink composition to about 9 to 10, which aids dissolution of the resin, if one is used. Moreover, an ink compositions having a pH of 9–10 is only minimally corrosive to stainless steel printer parts in aqueous compositions. Any amine or caustic, such as sodium or potassium hydroxide, may be used, with liquids being preferred over solids, and ammonium hydroxide being most preferred. Sufficient basic material should be added to achieve the desired pH, typically from about 0.1% to about 1.0% by weight of the composition.

The ink compositions of the present invention for the following examples can be made by conventional means. One method is as follows: The water should be added into a mixing tank. Then, the humectants should be added and mixed with the water. After the mixing is completed, the surfactant(s) should be added and also mixed thoroughly into the composition. When that mixing step is complete, a pH adjuster should be added into the composition. The resin component should then be added and mixed into the composition until it is completely dissolved. Finally, the colorant should be added, and the composition should be mixed thoroughly. The resulting ink composition should then be filtered.

The ink composition of this Example was also subject to indelibility tests. The results are shown in the following Table 1.

TABLE 1

| TESTS Process By Which Stamp Is Made | STAMPS | | | | | | | | | | | | | | | | | | | | |
|---|---|---|---|---|---|---|---|---|---|---|---|---|---|---|---|---|---|---|---|---|---|
| | Lithographic | | | Lithographic | | | Lithographic | | | Lithographic | | | Lithographic | | | Intaglio | | | Gravure | | |
| Dry Time (seconds) | 20 | | | 8 | | | 23 | | | 21 | | | 18 | | | 15 | | | 1 | | |
| Indelibility Test Number | #1 | #2 | #3 | #1 | #2 | #3 | #1 | #2 | #3 | #1 | #2 | #3 | #1 | #2 | #3 | #1 | #2 | #3 | #1 | #2 | #3 |
| 1. 20% MeOH | P | P | P | P | P | P | P | P | P | P | P | P | P | P | P | P | P | P | P | P | P |
| 2. 20% IPA | P | P | P | P | P | P | P | P | P | P | P | P | P | P | P | P | P | P | P | P | P |
| 3. 20% Acetone | P | P | P | P | P | P | P | P | P | P | P | P | P | P | P | P | P | P | P | P | P |
| 4. 10% Detergent | P | P | P | P | P | P | P | P | P | P | P | P | P | P | P | P | P | P | P | P | P |
| 5. Mineral Spirit | P | P | P | P | P | P | P | P | P | P | P | P | P | P | P | P | P | P | P | P | P |
| 6. 50% Xylene + 50% Toluene | P | P | P | P | P | P | P | P | P | P | P | P | P | P | P | P | P | P | P | P | P |
| 7. 20% Methylene Chloride | P | P | P | P | P | P | P | P | P | P | P | P | P | P | P | P | P | P | P | P | P |
| 8. Butyl Cellulose (BC) | P | P | P | P | P | P | P | P | P | P | P | P | P | P | P | P | P | P | P | P | P |
| 9. 20% Ethylene Glycol (EG) | P | P | P | P | P | P | P | P | P | P | P | P | P | P | P | p | P | P | P | P | P |
| 10. 33% Detergent + 33% EG + 33% BC | P | P | P | P | P | P | P | P | P | P | P | P | P | P | P | P | P | P | P | P | P |
| 11. 33% MeOH + 33% IPA + 33% BC | P | P | P | P | P | P | P | P | P | P | P | P | P | P | P | P | P | P | P | P | P |
| 12. 50% Bleach | P | P | P | P | P | P | P | P | P | P | P | P | P | P | P | p | P | P | P | P | P |
| 13. 10% Bleach | P | P | P | P | P | P | P | P | P | P | P | P | P | P | P | P | P | P | P | P | P |
| 14. Cooking Oil | P | P | P | P | P | P | P | P | P | P | P | P | P | P | P | P | P | P | P | P | P |
| 15. Stem (60 seconds) | 3 | | | 3 | | | 3 | | | 3 | | | 3 | | | 3 | | | 4 | | |
| 16. Boiling Water (60 seconds) | 3 | | | 3 | | | 3 | | | 3 | | | 3 | | | 3 | | | 4 | | |

All solutions are in water or as stated.
Test #1: Printed stamps rubbed lightly with solvent soaked facial tissues for 20 times.
Test #2: Printed stamps are soaked for 84 hours. Removed and rubbed lightly with solvent soaked facial tissue for 20 times.
Test #3: Printed stamsp are soaked for 240 hours in test solutions. The staмpls were observed every 24 hours.
Ratings: P = Pass, 0 = Total Fade, 1 = High Fade, 2 = Medium Fade, 3 = Slight Fade, 4 = No Fade The following examples are illustrative of ink compositions of the present invention.

Example 1

An ink composition having the following components was formulated as described above.

| Component | Amount (weight percent) |
|---|---|
| Deionized water | 82.2% |
| Propylene glycol monomethyl ether | 3.0% |
| Dipropylene glycol monomethyl ether | 1.0% |
| Surfynol TGE (Air Products) | 0.8% |
| Ammonium hydroxide | 0.3% |
| Airvol 205 S (Air Products) | 0.5% |
| Hostafine Black TS (Hoechst Celanese) | 12.2% |
| | 100.0% |

The resulting ink composition had a surface tension of 26.1 dynes/cm, and exhibited rapid penetration into the surface of postage stamps, made by either the lithographic, intaglio, or gravure processes, upon being ink-jetted onto said stamps. As a result, a dry time of less than 30 seconds was obtained.

Example 2

An ink composition having the following components was formulated as described above.

| Component | Amount (weight percent) |
|---|---|
| Deionized water | 74.5% |
| N-Methyl-2-Pyrrolidone | 2.0% |
| Carbitol | 3.0% |
| Propylene Glycol | 7.0% |
| Giv-Gard DXN | 0.1% |
| Ammonium hydroxide | 0.5% |
| Surfynol 104 PG50 | 0.1% |
| Surfynol TGE | 0.6% |
| Hostafine Black TS | 12.2% |
| | 100.0% |

The resulting ink composition had a surface tension of 26.9 dynes/cm, and exhibited rapid penetration into the surface of postage stamps, made by either the lithographic, intaglio, or gravure processes, upon being ink-jetted onto said stamps. As a result, a dry time of less than 120 seconds was obtained.

The ink composition of this Example was also subject to indelibility tests. The results are shown in the following Table 2.

TABLE 2

| TESTS Process By Which Stamp Is Made | STAMPS | | | | | | | | | | | | | |
|---|---|---|---|---|---|---|---|---|---|---|---|---|---|---|
| | Lithographic | | Lithographic | | Lithographic | | Lithographic | | Lithographic | | Intaglio | | Gravure | |
| Dry Time(seconds) | 72 | | 23 | | 83 | | 55 | | 53 | | 60 | | 1 | |
| Indilibility Test Number | #1 | #2 | #1 | #2 | #1 | #2 | #1 | #2 | #1 | #2 | #1 | #2 | #1 | #2 |
| 20% MeOH | 3 | 3 | 3 | 3 | 1 | 3 | 2 | 3 | 1 | 3 | 2 | 1D | 4 | 4 |
| 20% IPA | 3 | 3 | 3 | 3 | 1 | 1D | 2 | 0D | 2 | 3 | 2 | 1D | 4 | 4 |
| 20% Acetone | 3 | 3 | 3 | 3 | 1 | 2 | 2 | 0D | 2 | 3 | 2 | 1D | 4 | 4 |
| 10% Detergent | 3 | 0D | 3 | 0D | 1 | 1D | 1 | 0D | 0D | 1D | 0D | 1D | 4 | 4 |
| Butyl Cellulose (BC) | 1D | 1D | 1D | 1D | 0D | 0D | 1D | 0D | 0D | 0D | 0D | 1D | 4 | 4 |
| 50% Xylene + 50% Toluene | 3 | 1D | 3 | 1D | 1D | 1D | 3 | 1D | 2D | 2D | 2 | 1D | 4 | 4 |
| 20% Methylene Chloride | 1 | 2 | 3 | 4 | 2 | 0D | 3 | 1D | 1 | 0D | 1D | 1D | 4 | 4 |
| 20% Ethylene Glycol (EG) | 2 | 1D | 3 | 3 | 3 | 1D | 1D | 1D | 2 | 1D | 2 | 1D | 4 | 4 |
| 33% Detergent + 33% EG + 33% BC | 2 | 0D | 2D | 0D | 0D | 0D | 0D | 0D | 0D | 0D | 0D | 0D | 4 | 4 |
| 33% MeOH + 33% IPA + 33% BC | 2D | 0D | 3D | 0D | 0D | 0D | 0D | 0D | 0D | 0D | 0D | 0D | 4 | 4 |

TABLE 2-continued

| TESTS Process By Which Stamp Is Made Dry Time(seconds) | Lithographic 72 | | Lithographic 23 | | Lithographic 83 | | Lithographic 55 | | Lithographic 53 | | Intaglio 60 | | Gravure 1 | |
|---|---|---|---|---|---|---|---|---|---|---|---|---|---|---|
| Indilibility Test Number | #1 | #2 | #1 | #2 | #1 | #2 | #1 | #2 | #1 | #2 | #1 | #2 | #1 | #2 |
| Cooking Oil | | | | | | | | | | | | | | |
| Mineral Spirit | 5 | 4 | 3 | 4 | 3 | 4 | 3 | 4 | 3 | 4 | 2 | 4 | 4 | 4 |
| Steam | | | | | | | | | | | | | | |
| 50% Bleach | 2 | D | 3 | D | 0D | D | 1 | D | 0D | D | 0D | D | 4 | 4 |

All solutions are in water or as stated.
Test #1: Printed stamps rubbed lightly with solvent soaked facial tissues for 20 times.
Test #2: Printed stamps are soaked for 84 hours. Removed and rubbed lightly with solvent soaked facial tissue for 20 times.
Ratings: 0 = Total Fade, 1 = High Fade, 2 = Medium Fade, 3 = slight Fade, 4 = No Fade, 5 = No Change, D = stamp design and color defaced or damaged

Example 3

An ink composition having the following components was formulated as described above.

| Component | Amount (weight percent) |
|---|---|
| Deionized water | 74.7% |
| N-Methyl-2-Pyrrolidone | 2.0% |
| Carbitol | 3.0% |
| Propylene Glycol | 7.0% |
| Giv-Gard DXN | 0.1% |
| Surfynol TGE | 0.5% |
| Hostafine Black TS | 12.2% |
| Triethanol amine | 0.5% |
| | 100.0% |

The resulting ink composition had a surface tension of 27.7 dynes/cm, and exhibited rapid penetration into the surface of postage stamps, made by either the lithographic, intaglio, or gravure processes, upon being ink-jetted onto said stamps. As a result, a dry time of less than 30 seconds was obtained.

The ink composition of this Example was also subject to indelibility tests. The results are shown in the following Table 3.

TABLE 3

| TESTS Process By Which Stamp Is Made Dry Time (seconds) | Lithographic 60 | | | Lithographic 14 | | | Lithographic 60 | | | Lithographic 60 | | | Lithographic 18 | | | Integlio 15 | | | Gravure 1 | | |
|---|---|---|---|---|---|---|---|---|---|---|---|---|---|---|---|---|---|---|---|---|---|
| Indilibility Test Number | #1 | #2 | #3 | #1 | #2 | #3 | #1 | #2 | #3 | #1 | #2 | #3 | #1 | #2 | #3 | #1 | #2 | #3 | #1 | #2 | #3 |
| 1. 20% MeOH | 2 | 3 | 4 | 4 | 4 | 4 | 3 | 1D | 4 | 3 | 1 | 4 | 2 | 3D | 3 | 2 | 3D | 3 | 4 | 4 | 4 |
| 2. 20% IPA | 2 | 3 | 4 | 4 | 4 | 4 | 2 | 1D | 3 | 3 | 1 | 3 | 2 | 3D | 3 | 1 | 3D | 3 | 4 | 4 | 4 |
| 3. 20% Acetone | 2 | 3 | 4 | 4 | 4 | 4 | 1 | 1D | 3 | 1 | 1 | 3 | 1 | 3D | 3 | 1 | 3D | 3 | 4 | 4 | 4 |
| 4. 10% Detergent | 2 | 2 | 4 | 4 | 3 | 4 | 2 | 3 | 3D | 2 | 0D | 2 | 1 | 3D | 3D | 1 | 3D | 3D | 4 | 4 | 4 |
| 5. Mineral Spirit | 2 | 1 | 4 | 4 | 3 | 4 | 4 | 1D | 4 | 2 | 1 | 4 | 2 | 3D | 3D | 3 | 3D | 3D | 4 | 4 | 4 |
| 6. 50% Xylene + 50% Toluene | 0D | 3D | 4 | 0D | 3D | 4 | 0D | 3D | 3D | 0D | 4D | 3D | 0D | 2D | 3D | 0D | 3D | 3D | 5 | 4 | 4 |
| 7. 20% Methylene Chloride | 3 | 3 | 4 | 1 | 4 | 4 | 1 | 0D | 4D | 1 | 3 | 2 | 0D | 3D | 3D | 0D | 3D | 3D | 5 | 4 | 4 |
| S. Butyl Cellulose (BC) | 0D | 3D | 4 | 1D | 3D | 4 | 1D | 2D | 4D | 0D | 4 | 2 | 0D | 4D | 3D | 0D | 3D | 3D | 5 | 4 | 4 |
| 9. 20% Ethylene Glycol (EG) | 3 | 3 | 4 | 3 | 4 | 4 | 3 | 3 | 4 | 3 | 4D | 2 | 1 | 2D | 3D | 1 | 3D | 3D | 5 | 4 | 4 |
| 10. 33% Detergent + 33% EG + 33% BC | 1 | 3 | 4 | 0D | 4D | 4D | 0D | 4D | 4D | 0D | 3D | 4 | 0D | 3D | 3D | 0D | 4D | 3D | 5 | 4 | 4 |
| 11. 33% MeOH + 33% IPA + 33% BC | 1 | 3D | 4 | 0D | 4 | 4 | 0D | 4D | 3D | 0D | 4 | 4 | 0D | 3D | 3D | 0D | 4D | 3D | 5 | 4 | 4 |

All solutions are in water or as stated.
Test #1: Printed stamps rubbed lightly with solvent soaked facial tissues for 20 times.
Test #2: Printed stamps are soaked for 84 hours. Removed and rubbed lightly with solvent soaked facial tissue for 20 times.
Test #3: Printed stamps are soaked for 240 hours in test solutions. Observed the stamps every 24 hours.
Ratings: 0 = Total Fade, 1 = High Fade, 2 = Medium Fade, 3 = Moderate Fade, 4 = slight Fade, 5 = No Fade, 6 = stamp design and color defaced or damaged

We claim:

1. An ink composition suitable for ink jet printing operations, comprising a colorant, water, and a surfactant, said composition having a surface tension of less than 30 dynes/cm, a viscosity from about 1.6 to about 7.0 centipoises at 25° C., an electrical resistivity from about 50 to about 2000 ohm-cm, and a sonic velocity from about 1200 to about 1700 meters/second, wherein the colorant is present in an amount from about 7% to about 15% by weight of the ink composition, the water is present in an amount from about 70% to about 90% by weight of the ink composition, and the surfactant is present in an amount from about 0.2% to about 0.8% by weight of the ink composition.

2. The ink composition of claim 1, further comprising a humectant, wherein said humectant is present in an amount from about 2.5% to about 7% by weight of said ink composition.

3. The ink composition of claim 2, further comprising a resin, wherein said resin is present in an amount from about 0.2% to about 5% by weight of the ink composition.

4. An ink composition suitable for ink jet printing operations, comprising a pigment, water, and a surfactant, said composition having a surface tension of less than 30 dynes/cm, a viscosity from about 1.6 to about 7.0 centipoises at 25° C., an electrical resistivity from about 50 to about 2000 ohm-cm, and a sonic velocity from about 1200 to about 1700 meters/second, wherein the pigment is present in an amount from about 7% to about 15% by weight of the ink composition, the water is present in an amount from about 70% to about 90% by weight of the ink composition, and the surfactant is present in an amount from about 0.2% to about 0.8% by weight of the ink composition.

5. The ink composition of claim 4, further comprising a humectant, wherein said humectant is present in an amount from about 2.5% to about 7% by weight of said ink composition.

6. The ink composition of claim 5, further comprising a resin, wherein said resin is present in an amount from about 0.2% to about 5% by weight of the ink composition.

7. A method of printing cancellation marks on a stamp, comprising forming the ink composition of claim 1 into droplets, projecting a stream of the droplets to a stamp, and controlling the direction of said stream electronically so that the droplets form a printed image on said stamp.

8. A method of printing cancellation marks on a stamp, comprising forming the ink composition of claim 4 into droplets, projecting a stream of the droplets to a stamp, and controlling the direction of said stream electronically so that the droplets form a printed image on said stamp.

9. A method of printing cancellation marks on a stamp, comprising forming an ink composition comprising from about 7% to about 15% colorant by weight of said ink composition, from about 70% to about 90% water by weight of said ink composition, and from about 0.2% to about 0.8% surfactant by weight of said ink composition, said composition having a surface tension of less than about 30 dynes/cm into droplets, projecting a stream of the droplets to the stamp, and controlling the direction of said stream electronically so that the droplets form a printed image on said stamp.

10. The method of clam 9, wherein the colorant is a pigment.

* * * * *